United States Patent
Chen et al.

(10) Patent No.: US 11,667,393 B2
(45) Date of Patent: Jun. 6, 2023

(54) SYSTEMS AND METHODS FOR POWER MANAGEMENT AND CONTROL OF MULTIPLE POWER SOURCES

(71) Applicant: Honeywell International Inc., Charlotte, NC (US)

(72) Inventors: Liming Chen, Shanghai (CN); Fei Wang, Shanghai (CN)

(73) Assignee: Honeywell International Inc., Charlotte, NC (US)

( * ) Notice: Subject to any disclaimer, the term of this patent is extended or adjusted under 35 U.S.C. 154(b) by 231 days.

(21) Appl. No.: 17/121,417

(22) Filed: Dec. 14, 2020

(65) Prior Publication Data
US 2022/0185493 A1   Jun. 16, 2022

(51) Int. Cl.
*B64D 31/06*   (2006.01)
*B60L 58/12*   (2019.01)
(Continued)

(52) U.S. Cl.
CPC ............ *B64D 31/06* (2013.01); *B60L 1/006* (2013.01); *B60L 50/75* (2019.02); *B60L 58/12* (2019.02);
(Continued)

(58) Field of Classification Search
None
See application file for complete search history.

(56) References Cited

U.S. PATENT DOCUMENTS 7,634,329 B2    12/2009  Lie et al.
7,761,198 B2 *  7/2010   Bhardwaj ................ B60L 1/00
                                                307/45
(Continued)

FOREIGN PATENT DOCUMENTS

WO   2019211810 A1   11/2019

OTHER PUBLICATIONS

Maasoumy Mehdi et al: "Optimal load management system for Aircraft Electric Power distribution", 52nd IEEE Conference on Decision and Control, IEEE, Dec. 10, 2013 (Dec. 10, 2013), pp. 2939-2945, XP032576874, ISSN: 0743-1546, DOI: 10.1109/CDC.2013.6760330 ISBN: 978-1-4673-5714-2 [retrieved on Mar. 7, 2014].

*Primary Examiner* — Jared Fureman
*Assistant Examiner* — Joel Barnett
(74) *Attorney, Agent, or Firm* — Bookoff McAndrews PLLC

(57) ABSTRACT

Disclosed are systems and methods for a power control system for a vehicle having multiple power sources. The power control system may include a plurality of sensors associated with one or more power sources and a microcontroller configured to receive a plurality of signal inputs, wherein the microcontroller selects a power state for the power control system based at least in part on the plurality of signal inputs from the plurality of sensors. The power state may be selected from a group including a first power state, wherein power is provided to a critical power subsystem, an essential power subsystem, and an auxiliary power subsystem, a second power state, wherein power is provided to the critical power subsystem and the essential power subsystem of the vehicle, and a third power state, wherein power is provided only to the critical power subsystem of the vehicle.

20 Claims, 8 Drawing Sheets

(51) Int. Cl.
  *B60L 58/24* (2019.01)
  *B60L 50/75* (2019.01)
  *B60L 58/30* (2019.01)
  *B60L 1/00* (2006.01)
  *B64D 27/24* (2006.01)
  *B64D 41/00* (2006.01)
  *G06F 1/26* (2006.01)
  *G06F 1/28* (2006.01)
  *G07C 5/08* (2006.01)

(52) U.S. Cl.
  CPC ............... *B60L 58/24* (2019.02); *B60L 58/30* (2019.02); *B64D 27/24* (2013.01); *B64D 41/00* (2013.01); *G06F 1/263* (2013.01); *G06F 1/28* (2013.01); *G07C 5/0841* (2013.01); *B60L 2200/10* (2013.01); *B60L 2240/545* (2013.01); *B60L 2240/547* (2013.01); *B64D 2041/005* (2013.01)

(56) References Cited

U.S. PATENT DOCUMENTS

| | | |
|---|---|---|
| 8,598,840 B2 | 12/2013 | Yount et al. |
| 9,531,039 B2 | 12/2016 | Heubner et al. |
| 10,322,824 B1 | 6/2019 | Demont et al. |
| 2017/0277607 A1 | 9/2017 | Samii et al. |
| 2020/0047911 A1* | 2/2020 | Parsons .................. B64C 27/04 |
| 2021/0188130 A1* | 6/2021 | Kunzwa ................. B60L 58/15 |

* cited by examiner

US 11,667,393 B2

SYSTEMS AND METHODS FOR POWER MANAGEMENT AND CONTROL OF MULTIPLE POWER SOURCES

TECHNICAL FIELD

Various embodiments of the present disclosure relate generally to the field of power management for urban air mobility vehicles and, more particularly, to systems and methods for power management and control of multiple power sources using sensor inputs to select an appropriate power state for the vehicle.

BACKGROUND

Many urban air mobility (UAM) vehicles are propelled by electric motors that are powered by fully electric or hybrid power systems. To operate a UAM, these power systems may have to provide discharge rates of 100+ amperes (A). At these discharge rates, battery conditions such as over-discharging may cause a battery system to overheat or fail. However, in a vehicle such as a UAM, such battery conditions may make it difficult or impossible for the vehicle to continue its flight. Because of this, UAM vehicles generally require stringent safety standards and redundancies, while still having constrained resource requirements (e.g., energy, payload, weight, etc.). Therefore, it may be a challenge providing a power management system that is able to monitor potentially dangerous conditions within the power systems and automatically manage them such that vehicle flight may be maintained. Even with the recent advances in battery technologies, it may be a challenge to build a power control system that allows motors and controls to be safely powered by multiple and/or redundant power sources.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for power management and control of multiple power sources.

For instance, a power control system for a vehicle having multiple power sources may include a plurality of sensors associated with one or more power sources and a microcontroller configured to receive a plurality of signal inputs from the plurality of sensors, wherein the microcontroller selects a power state for the power control system based at least in part on the plurality of signal inputs from the plurality of sensors. The power state may be selected from a group including a first power state, wherein the microcontroller causes a power regulator to provide power to a critical power subsystem, an essential power subsystem, and an auxiliary power subsystem of the vehicle, a second power state, wherein the microcontroller causes the power regulator to provide power to the critical power subsystem and the essential power subsystem of the vehicle, and does not provide power to the auxiliary power subsystem of the vehicle, and a third power state, wherein the microcontroller causes the power regulator to provide power to the critical power subsystem of the vehicle, and does not provide power to the essential power subsystem or the auxiliary power subsystem of the vehicle. The critical power subsystem of the vehicle may be configured to provide power to a first set of equipment on the vehicle that maintains flight, the essential power subsystem of the vehicle is configured to provide power to a second set of equipment on the vehicle, and the auxiliary power subsystem of the vehicle is configured to provide power to one or more of: a vehicle entertainment system, an air conditioning system, a wireless internet system, and an accessory charging system.

Moreover, a power control system for a vehicle may be used with a vehicle that includes a critical power subsystem configured to provide power to a first set of equipment on the vehicle that maintains flight, an essential power subsystem configured to provide power to a second set of equipment on the vehicle, and an auxiliary power subsystem configured to provide power to one or more of: a vehicle entertainment system, an air conditioning system, a wireless internet system, and an accessory charging system. The power control system may include a microcontroller having a processor and a memory, wherein the memory comprises instructions stored thereon that, when executed by the processor, cause the processor to receive a plurality of signal inputs from a plurality of sensors associated with one or more power sources and select a power state for the power control system based at least in part on the plurality of signal inputs from the plurality of sensors. The power state can be selected from a group including a first power state, wherein the microcontroller causes a power regulator to provide power to a critical power subsystem, an essential power subsystem, and an auxiliary power subsystem of the vehicle; a second power state, wherein the microcontroller causes the power regulator to provide power to the critical power subsystem and the essential power subsystem of the vehicle, and does not provide power to the auxiliary power subsystem of the vehicle; and a third power state, wherein the microcontroller causes the power regulator to provide power to the critical power subsystem of the vehicle, and does not provide power to the essential power subsystem or the auxiliary power subsystem of the vehicle.

Moreover, a power control system for a vehicle may include a plurality of sensors associated with three or more power sources, wherein at least two of the three or more power sources each comprise one or more batteries, a microcontroller configured to receive a plurality of signal inputs from the plurality of sensors, wherein the microcontroller selects a power state for the power control system based at least in part on the plurality of signal inputs from the plurality of sensors. The power state may be selected from a group including a first power state, wherein the microcontroller causes a power regulator to provide power to a critical power subsystem, an essential power subsystem, and an auxiliary power subsystem of the vehicle, a second power state, wherein the microcontroller causes the power regulator to provide power to the critical power subsystem and the essential power subsystem of the vehicle, and does not provide power to the auxiliary power subsystem of the vehicle, and a third power state, wherein the microcontroller causes the power regulator to provide power to the critical power subsystem of the vehicle, and does not provide power to the essential power subsystem or the auxiliary power subsystem of the vehicle. The critical power subsystem of the vehicle may be configured to provide power to a first set of equipment on the vehicle that maintains flight, the essential power subsystem of the vehicle may be configured to provide power to a second set of equipment on the vehicle, and the auxiliary power subsystem of the vehicle may be configured to provide power to one or more of: a vehicle entertainment system, an air conditioning system, a wireless internet system, and an accessory charging system. The microcontroller of the system may be further configured to register a sensor fault when one or more of the plurality of signal inputs is determined to be irregular, and wherein the microcontroller can be further configured to cause the power regulator to shut down one of the three or more power sources when two or more sensor faults have been registered with respect to one of the three or more power sources.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to the field of power management and control for urban air mobility vehicles and, more particularly, to systems and methods for power management and control of multiple power sources.

The present disclosure is directed to overcoming one or more of the challenges discussed above in the Background. As UAM vehicles increasingly rely on all-electric propulsion systems, robust power management and control systems that are capable of satisfying extremely low failure rate requirements are needed. Accordingly, UAM vehicles may use multiple power sources with additional redundancies to be able to meet these failure rate requirements, and those power sources and redundancies may benefit from a power management and control system capable of, for example, shutting down faulty power sources and reducing power demand as issues arise and factors of safety deteriorate.

In general, the present disclosure is directed to power control systems configured to monitor and regulate power sources and power subsystems, particularly in vehicle applications with three or more power sources. For instance, the systems and methods of the present disclosure may enable a vehicle to shut down a failing power source, and divert remaining power to critical and/or essential power subsystems. Loss of a power source needed to operate all subsystems of a UAM vehicle, such as when a battery overheats, can be one of the most critical failures to be managed in UAM vehicles as well other types of aircraft, since power loss may result in an inability to safely operate and/or land a vehicle. The systems and/or methods of the present disclosure for power management and control of multiple power sources may have an advantage of enabling a vehicle to meet low failure rate requirements.

The systems and methods of the present disclosure may provide a vehicle having multiple power sources with the ability to monitor and control those power sources such that critical and/or essential power subsystems are able to remain in operation during a power source failure. While this disclosure describes the systems and methods with reference to aircraft, it should be appreciated that the present systems and methods are applicable to various other vehicles, including those of drones, automobiles, ships, spacecraft, or any other manned, unmanned, autonomous, and/or internet-connected vehicles.

Figure 1:
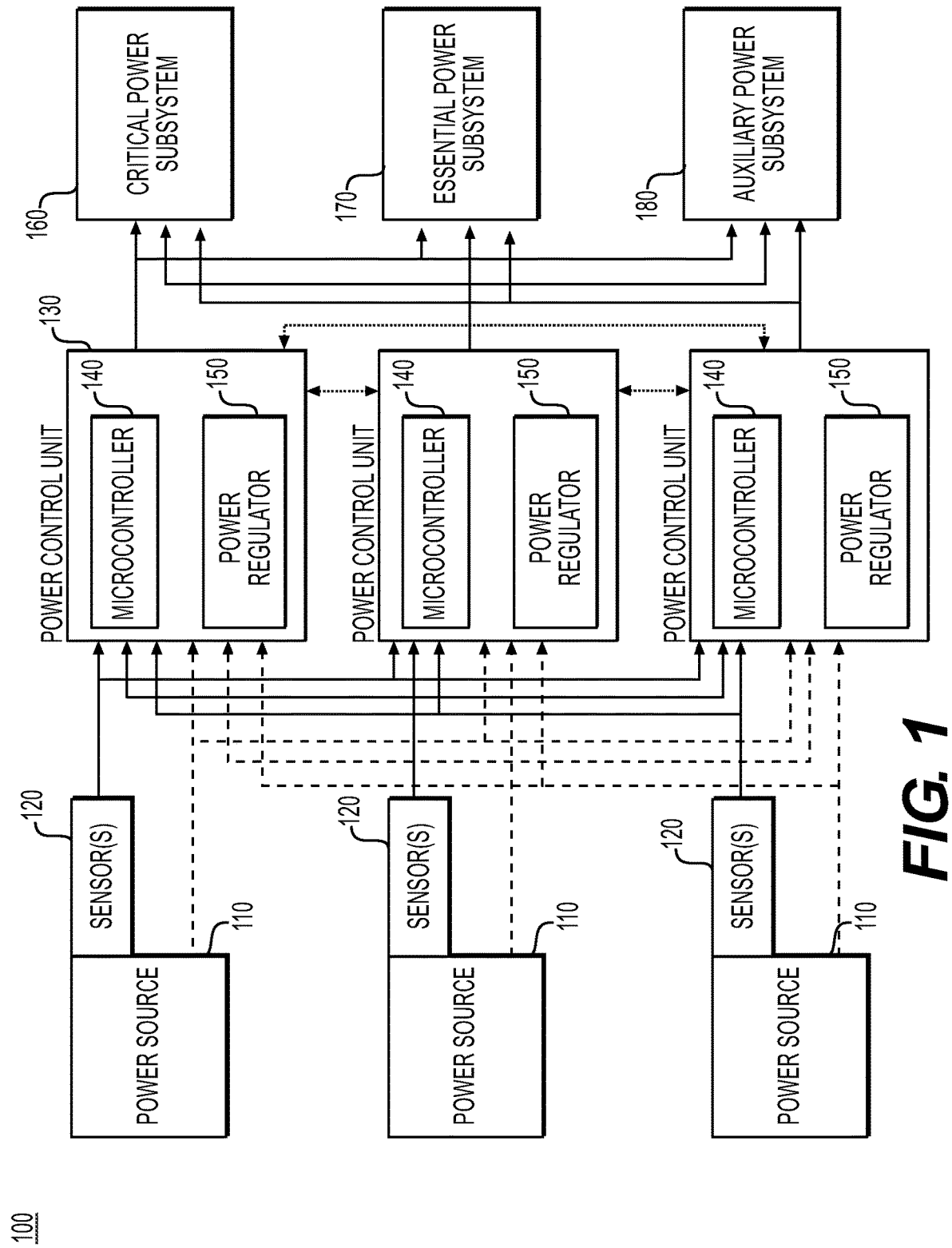
FIG. 1 depicts an exemplary power system for a vehicle in which methods, systems, and other aspects of the present disclosure may be implemented.

FIG. 1 depicts an exemplary power system for a vehicle in which systems, methods, and other aspects of the present disclosure may be implemented. Vehicle power system 100 can include power sources 110 and one or more sensors 120. Power sources 110 may be of any type suitable to the vehicle application, such as, for example, a battery, battery array, fuel cell, or combustion engine. Sensors 120 may each be associated with one of the power sources 110, and may include, for example, sensors to measure a state of charge, temperature, current, voltage, and/or pressure.

Power sources 110 may direct the power generated into power control units 130, and sensors 120 may direct the sensor signals to power control units 130 as well. Each power control unit 130 can include microcontroller 140 and power regulator 150. At any given time, one of the power control units 130 may be designated as the primary power control unit, with the remaining power control units being designated as secondary power control units. Microcontroller 140 can be configured to receive sensor signals from sensors 120 and to provide control signals to power regulator 150.

Power regulators 150 can receive the power generated by power sources 110, and may be configured to regulate the input power and output regulated power at multiple voltages for different vehicle equipment and subsystems. For example, power regulator 150 may provide lower voltage DC outputs (e.g., 3.3 V, 5 V) to power equipment such as, for example, sensors and lighting; medium voltage DC outputs (e.g., 12 V, 14 V, 28 V) to power equipment such as, for example, computers, navigation systems, displays, communication systems, and flight actuators; higher voltage DC or AC outputs (e.g., 220 V) to power vehicle components such as, for example, motors for vehicle propulsion.

Microcontrollers 140 may communicate with each other and monitor their inputs and outputs frame by frame with defined threshold. In the event that a miscompare exists, the affected microcontroller 140 may notify the others that it has failed and/or is failing. If the affected microcontroller is the one associated with the power control unit designated as the primary power control unit, one of the remaining non-failing power control units will be designated as the new primary power control unit. Depending on the control signals received from microcontroller 140, power regulator 150 may direct power to various systems and subsystems of the vehicle. For example, power regulator 150 may direct a certain amount of power at certain voltages to a critical power subsystem 160, an essential power subsystem 170, and an auxiliary power subsystem 180.

As indicated above, FIG. 1 is provided merely as an example of a vehicle power system that includes exemplary types of vehicle equipment. It should be appreciated that additional and/or fewer elements such as, for example, power sources, sensors, regulators, and power subsystems may be included in power system 100 than those shown and described herein, without departing from a scope of this disclosure.

Figure 2:
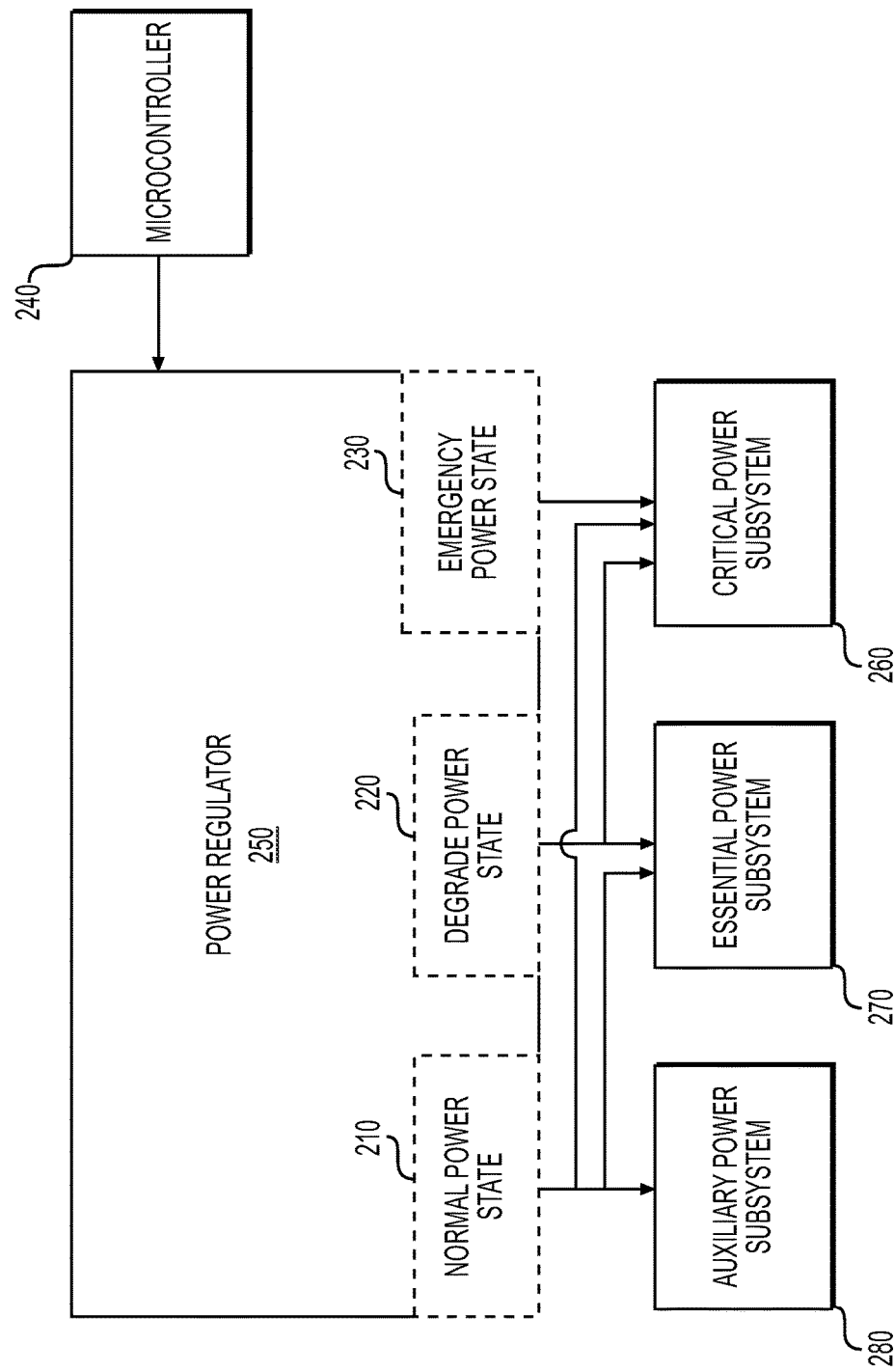
FIG. 2 depicts an exemplary block diagram of a power management system according to one or more embodiments.

FIG. 2 depicts an exemplary block diagram of a power management system 200 that includes a plurality of power states 210, 220, 230 that may be selected by microcontroller 240. Microcontroller may send a control signal to power regulator 250 that directs power regulator 250 to engage power states 210, 220, 230, and output power to power subsystems 260, 270, 280.

For example, under vehicle power system conditions that are substantially normal, microcontroller 240 can select a normal power state 210. As denoted by the arrows in FIG. 2, normal power state 210 could be configured such that power regulator 250 directs power to critical power subsystem 260, essential power subsystem 270, and auxiliary power subsystem 280.

As vehicle power system conditions deteriorate, microcontroller 240 may select a degrade power state 220. Degrade power state 220 may be configured to reduce the load on the vehicle power system, such that power regulator 250 only directs power to critical power subsystem 260 and essential power subsystem 270. By not directing power to auxiliary power subsystem 280, certain vehicle equipment (e.g., vehicle entertainment system, air conditioning system, wireless internet system, accessory charging system) may no longer draw power or be operational, however the vehicle equipment used for communications, navigation, and maintaining vehicle flight may remain powered and operational.

In the event that vehicle power system conditions deteriorate further, microcontroller 240 may select an emergency power state 230. Emergency power state 230 may be configured to further reduce the load on the vehicle power system, such that power regulator 250 only directs power to critical power subsystem 260. By not directing power to essential power subsystem 270, the vehicle may shut down not only the non-essential equipment powered by the auxiliary power subsystem 280, but also equipment such as, for example, particular sensors, actuators, motors, motor controllers, displays, and communication systems may no longer draw power or be operational. The essential systems not deemed critical may include redundancies (e.g., back-up actuators, dual displays, redundant communication/navigation systems), equipment rendered non-functional by the deteriorating state of the vehicle power system (e.g., sensors for power sources that have failed, motors and motor controllers that are responsible for overcurrent conditions), and/or flight aids and other equipment that is not to be used during an emergency (e.g., auto-pilot, certain motors and motor controllers). However, critical power system can be designed such that the vehicle equipment necessary for basic communications, emergency navigation, and maintaining vehicle flight can remain powered and operational to allow the vehicle to, for example, conduct emergency maneuvers and landings.

Figure 3:
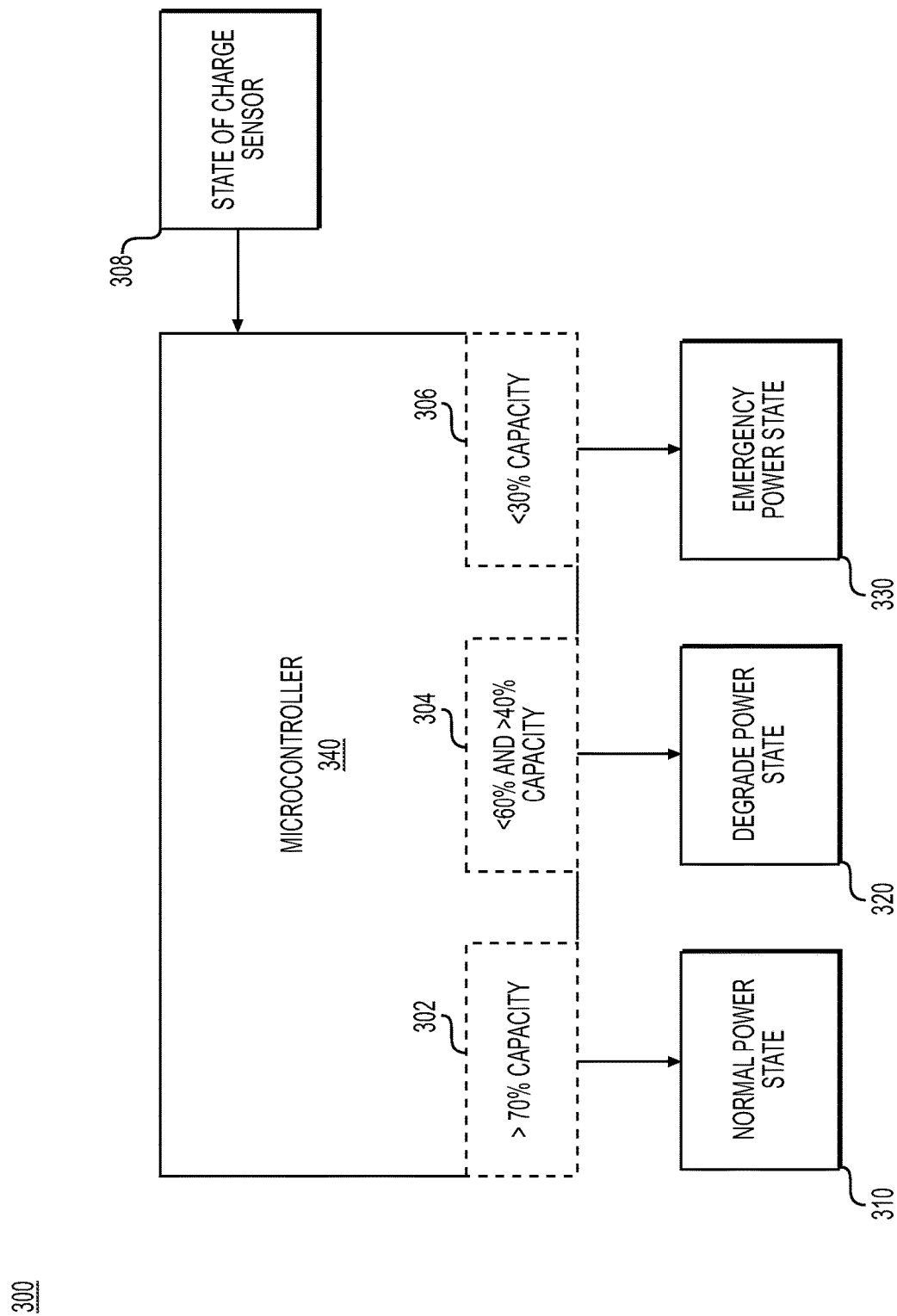
FIG. 3 depicts an exemplary block diagram of a state of charge control subsystem according to one or more embodiments.

FIG. 3 depicts an exemplary block diagram of a state of charge control subsystem 300 that includes a plurality of exemplary charge state ranges 302, 304, 306 that may be indicated by state of charge sensor 308. State of charge sensor 308 may monitor and/or estimate the power level remaining in one or more power sources, and may send a sensor signal indicative of that power level(s) to microcontroller 340. Based on which charge state range is indicated, microcontroller 340 may select power states 310, 320, 330.

In some embodiments when the power level for the vehicle is high (e.g., greater than 70% of power capacity), microcontroller 340 may select the normal power state. As the power level for the vehicle drops into a lower range (e.g., between 40% and 60% of power capacity), microcontroller 340 may select the degrade power state in order to reduce the power demands on the vehicle power system. This change may enable the vehicle to maintain an appropriate margin of safety throughout the vehicle flight.

If the power level drops to a certain critical level (e.g., less than 30% of power capacity), microcontroller 340 may select the emergency power state in order to further reduce the power demands on the vehicle power system to a low level. In some embodiments, there may be additional power states that microcontroller 340 may be able to select. For example, in some embodiments individual subsystems or vehicle equipment may each have their own vehicle power level thresholds such that each individual subsystem is shut down as the vehicle power level reaches a certain point.

Figure 4:
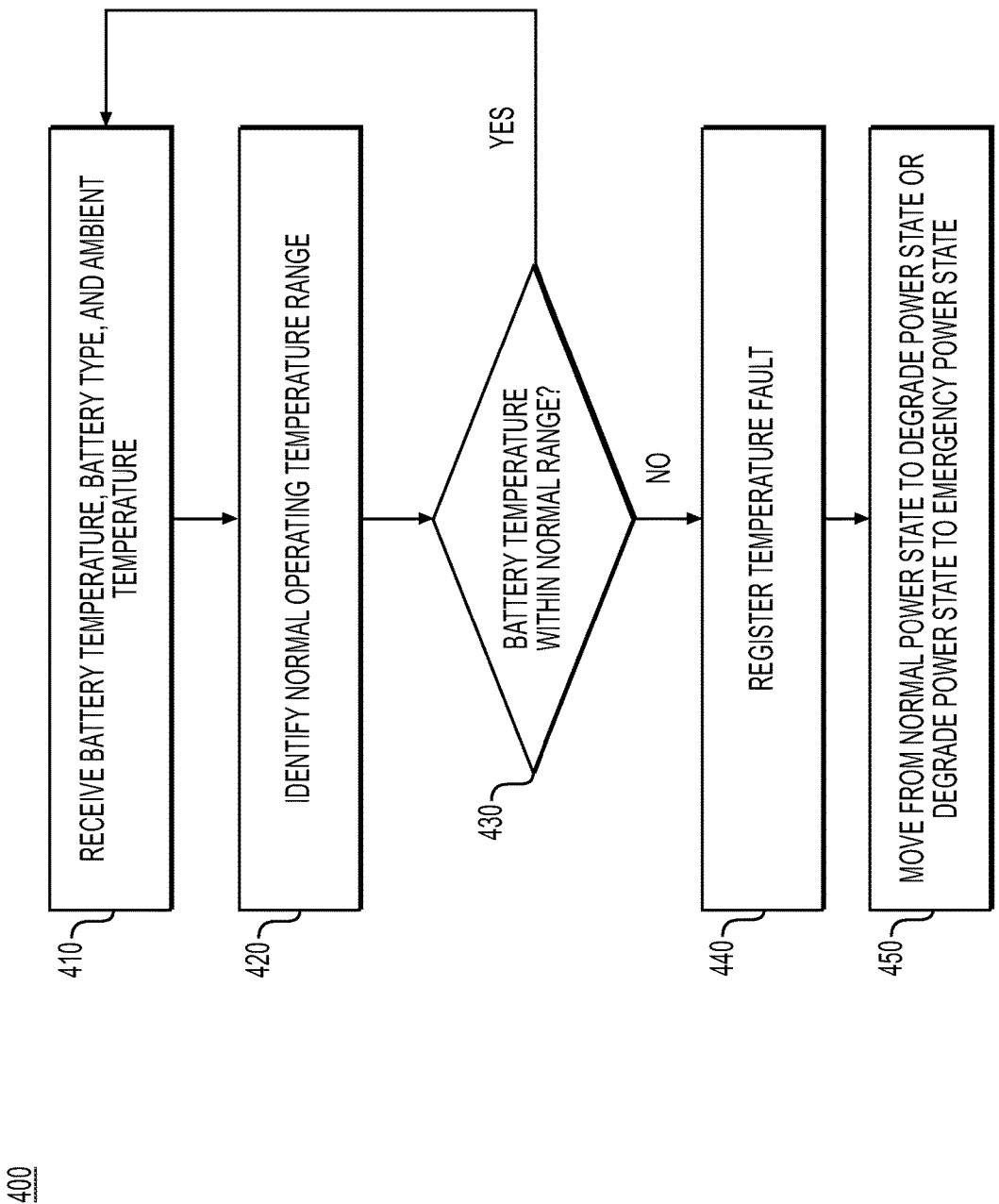
FIG. 4 depicts a flowchart for an exemplary method of responding to an abnormal battery temperature, according to one or more embodiments of a power control system.

FIG. 4 depicts a flowchart illustrating a method 400 for responding to an abnormal battery temperature, according to one or more embodiments of the present disclosure. The method may be performed by a system in accordance with the present disclosure, including one or more of the devices that comprise the vehicle power system 100.

Method 400 may begin at step 410 with the microcontroller receiving a battery temperature, battery type, and ambient temperature. The battery temperature may be provided to the microcontroller by one or more battery temperature sensors, and the ambient temperature may be provided to the microcontroller by one or more ambient temperature sensors. The microcontroller may determine the battery type via a sensor, user input, or any other suitable method. Once determined, at step 420, the microcontroller may identify a normal operating temperature range for the battery, given its type. This normal operating temperature range may also be based on other inputs such as, for example, the ambient temperature, the load on the battery, the altitude of the vehicle, the state of charge of the battery, or other criteria relevant to the identification of a safe operating temperature range for the particular battery in the current operating conditions.

The microcontroller may then compare the battery temperature to the normal operating temperature range, at 430, and if the battery is within the range, the microcontroller may return to step 410 (step 430: Yes). In the event that the battery temperature is outside of the normal operating range, due to being too cold or too hot, at step 440, the microcontroller can register a temperature fault in the system. There are a number of potential causes for the battery temperature to be outside of the normal operating range, but such an abnormal battery temperature can be indicative of an issue. Since most of the potential causes are related to an overloading or other battery failure, it may be desirable to reduce the load on the battery with the abnormal temperature, if not reduce the load on the power sources more broadly. As a result, after registering a temperature fault, at step 450, the vehicle and its power control unit may select the next lowest power state from the current power state (e.g., move to the degrade power state from the normal power state, move to the emergency power state from the degrade power state).

Figure 5:
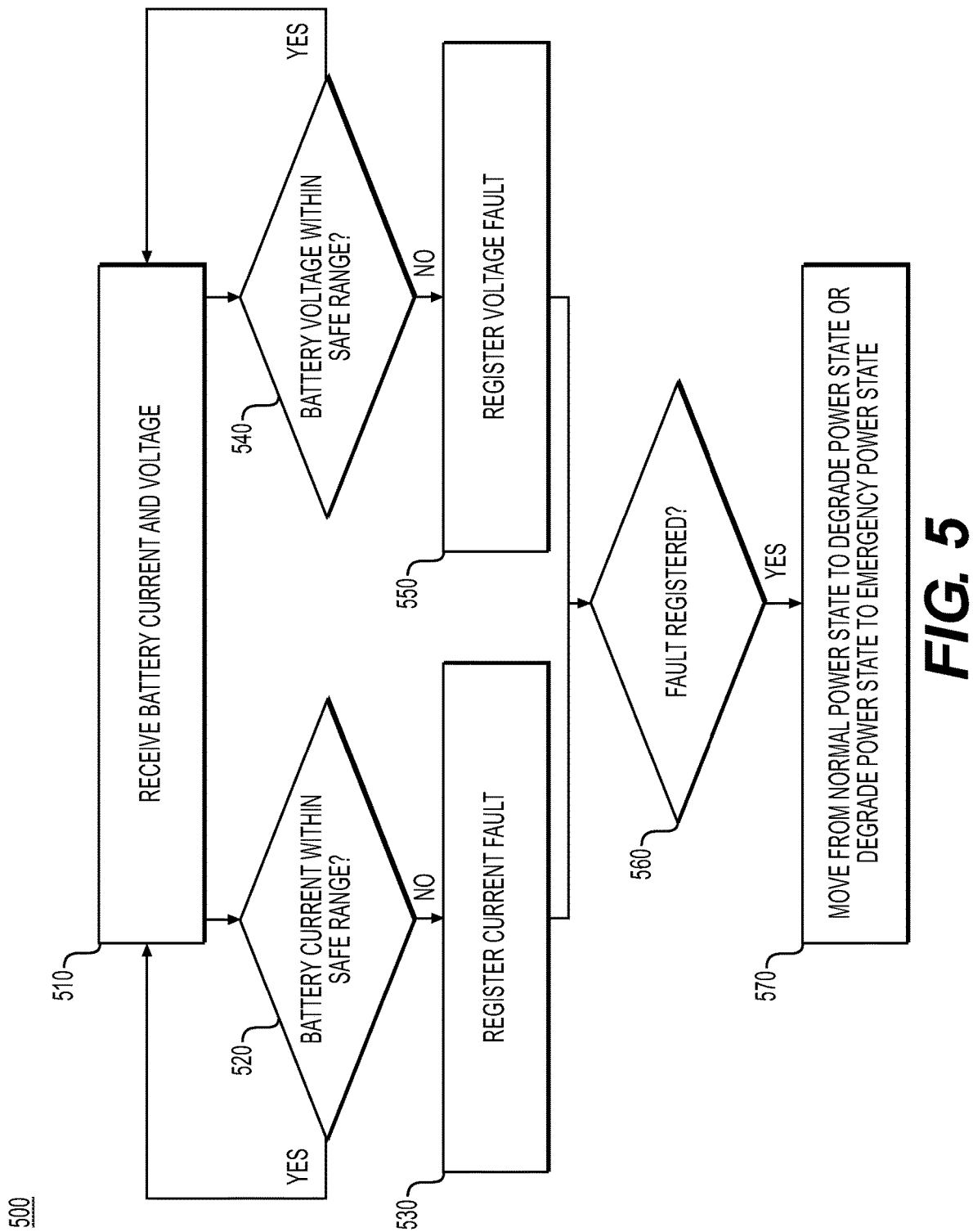
FIG. 5 depicts a flowchart for an exemplary method of responding to an unsafe battery current and/or voltage, according to one or more embodiments of a power control system.

FIG. 5 depicts a flowchart illustrating a method 500 for responding to an unsafe battery current and/or voltage, according to one or more embodiments of the present disclosure. The method may be performed by a system in accordance with the present disclosure, including one or more of the devices that comprise the vehicle power system 100.

Method 500 may begin at step 510 with the microcontroller receiving a battery current and voltage. The battery current may be provided to the microcontroller by one or more battery current sensors, and the voltage may be provided to the microcontroller by one or more battery voltage sensors.

In some embodiments, the microcontroller may determine safe current and voltage ranges, given its type. These safe current and voltage ranges may also be based on other inputs such as, for example, the ambient temperature, the load on the battery, the altitude of the vehicle, the state of charge of the battery, or other criteria relevant to the identification of a safe operating safe current and voltage ranges for the particular battery in the current operating conditions.

Either based on preprogrammed safe current and voltage ranges or having determined those ranges, the microcontroller may then compare the battery current to the safe current range, at 520, and if the battery is within the range, the microcontroller may return to step 510 (step 520: Yes). In the event that the battery current is outside of the safe operating range, at step 530, the microcontroller can register a current fault in the system. Similarly, at step 540, the microcontroller may compare the battery voltage to the safe voltage range, and if the battery is within the range, the microcontroller may return to step 510 (step 540: Yes). In the event that the battery voltage is outside of the safe operating range, at step 550, the microcontroller can register a voltage fault in the system.

As with battery temperature, there are a number of potential causes for the battery current and voltage to be outside of the normal operating range, but abnormal battery currents and/or voltages may be indicative of an issue with one or more of the batteries. Having registered one or more faults, it may be desirable to reduce the load on the battery with the abnormal current and/or voltage, if not reduce the load on the power sources more broadly. As a result, after determining a current and/or voltage fault has been registered (step 560: Yes), at step 570, the vehicle and its power control unit may select the next lowest power state from the current power state (e.g., move to the degrade power state from the normal power state, move to the emergency power state from the degrade power state).

Figure 6:
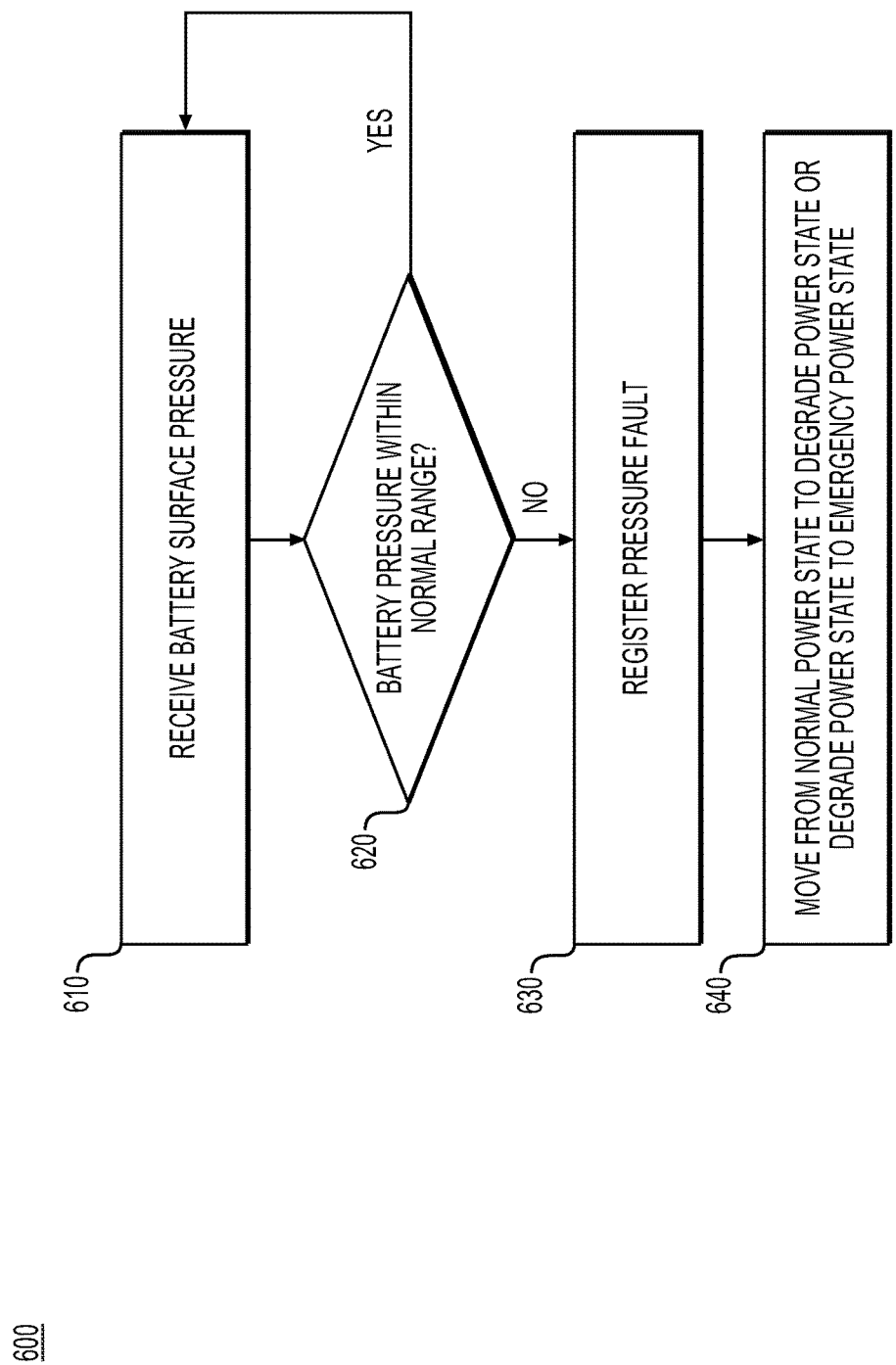
FIG. 6 depicts a flowchart for an exemplary method of responding to an abnormal battery pressure, according to one or more embodiments of a power control system.

FIG. 6 depicts a flowchart illustrating a method 600 for responding to an abnormal battery surface pressure, according to one or more embodiments of the present disclosure. The method may be performed by a system in accordance with the present disclosure, including one or more of the devices that comprise the vehicle power system 100.

Method 600 may begin at step 610 with the microcontroller receiving a battery surface pressure, provided to the microcontroller by one or more battery pressure sensors, and the ambient temperature may be provided to the microcontroller by one or more ambient temperature sensors. The surface pressure of a battery may be related to the operability of that battery. For example, if the surface pressure is seen to be increasing, it may be indicative of a swelling or expansion of the battery. Battery swelling can be caused by a number of conditions, such as overcharging, over discharging, battery contamination, high temperatures, and/or mechanical damage. In some instances, a swelling battery may precede a significant failure or explosion of the battery.

The microcontroller may monitor the battery surface pressure, and should the battery pressure be determined to be normal, the microcontroller may return to step 610 (step 620: Yes). In the event that the battery pressure has risen and is outside of the normal operating range (step 620: No), for any of the reasons discussed above or for other reasons, at step 630, the microcontroller can register a pressure fault in the system. Regardless of the cause of the increased battery surface pressure, it may be desirable to reduce the load on the battery with the abnormal pressure, if not reduce the load on the power sources more broadly. Therefore, after registering a pressure fault, at step 640, the vehicle and its power control unit may select the next lowest power state from the current power state (e.g., move to the degrade power state from the normal power state, move to the emergency power state from the degrade power state).

Figure 7:
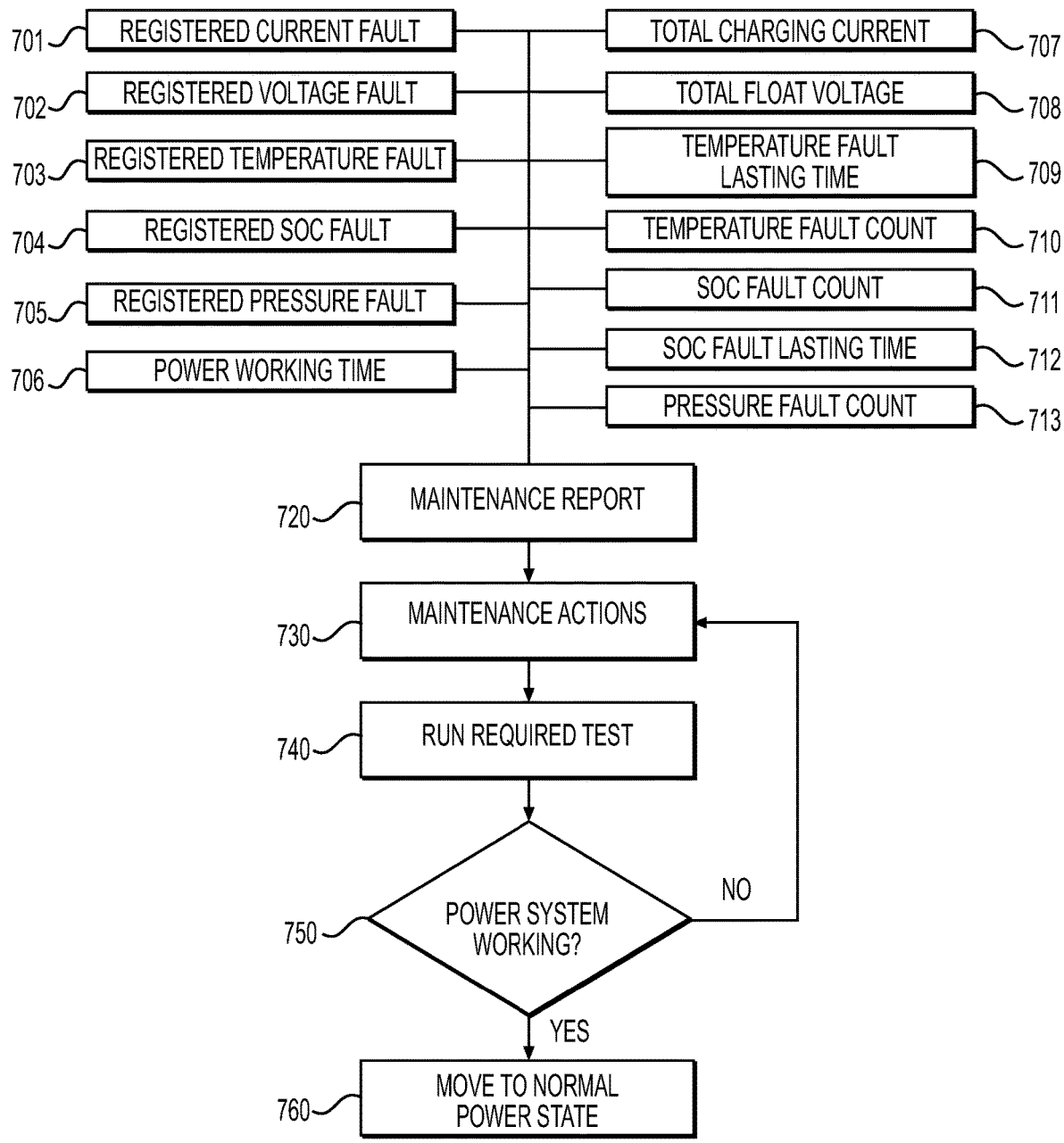
FIG. 7 depicts a flowchart for an exemplary method of responding to abnormal conditions, according to one or more embodiments of an auto maintenance subsystem.

FIG. 7 depicts a flowchart illustrating a method 700 for responding to abnormal conditions, according to one or more embodiments of the present disclosure. The method may be performed by a system in accordance with the present disclosure, including one or more of the devices that comprise the vehicle power system 100.

Method 700 may begin with one or more of steps 701-713 wherein the microcontroller may receive: a current fault, voltage fault, temperature fault, SoC fault, pressure fault, power working time, total charge current, total float voltage, temperature fault lasting time, temperature fault count, SoC fault count, SoC fault lasting time, and/or pressure fault count. The current fault, voltage fault, temperature fault, SoC fault, pressure fault, power working time, total charge current, total float voltage, temperature fault lasting time, temperature fault count, SoC fault count, SoC fault lasting time, and/or pressure fault count may be provided to the microcontroller by power monitoring.

Based at least in part on which of steps 701-713 have resulted in faults being received, at step 720, an auto-maintenance subroutine may generate a maintenance report. The microcontroller may then convey the maintenance report to an operator in order to perform associated maintenance actions at step 730. Each battery or device can be registered through firmware driver design, and operating conditions may be recorded to guide maintenance target actions. When an individual fault is registered, the system may include the fault in a stored fault record for each battery or device.

To remove or clear the current fault record, the system may perform required tests at step 740. The microcontroller may then review the test results and determine if the power system has returned to being fully functional at step 750, and if the power system is in normal state, the vehicle and its power control unit may move to the normal power state (step 760). In the event that the associated faults have not been fixed at step 750, the microcontroller will annunciate to the operator for performing further maintenance actions and the system may return to step 730.

Figure 8:
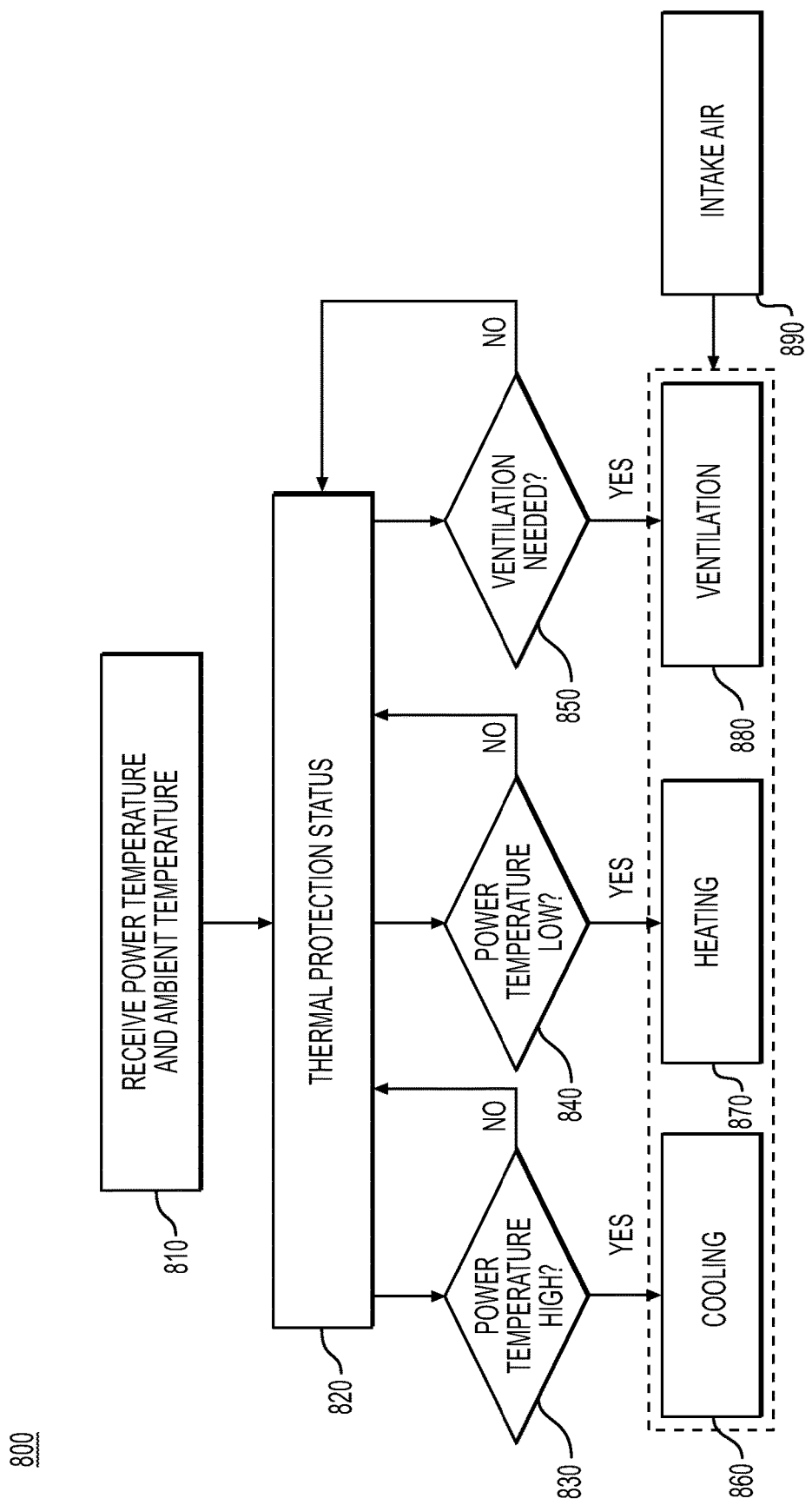
FIG. 8 depicts a flowchart for an exemplary method of responding to a power thermal status, according to one or more embodiments of a power thermal protection subsystem.

FIG. 8 depicts a flowchart for an exemplary method of responding to a power thermal status, according to one or more embodiments of the present disclosure. The method may be performed by a system in accordance with the present disclosure, including one or more of the devices that comprise the vehicle power system 100.

Method 800 may begin at step 810 with the receipt of power temperature and ambient temperature. The power temperature may be provided to the microcontroller by one or more power temperature sensors, and the ambient temperature may be provided to the microcontroller by one or more ambient temperature sensors. At step 820, the microcontroller may generate the thermal protection status for the power sources. The microcontroller may determine if the power temperature is high based on the thermal protection status at step 830, and if the power temperature is too high, at step 860, the microcontroller can activate a cooling function, for example, by using heat pipe and intake air. If the power temperature is within the range, the microcontroller may return to step 820 (step 830: No).

The microcontroller may determine if the power temperature is low based on the thermal protection status at step 840, and if the power temperature is too low, at step 870, the microcontroller can activate a heating function, for example, by using heat pipe air. If the power temperature is back to normal, the microcontroller may return to step 820 (step 840: No). Similarly, the microcontroller may determine whether or not ventilation is required to exhaust any hazardous gases that have accumulated within one or more power sources at step 850. The microcontroller can start the ventilation function by using intake air 890, at step 880, and if the ventilation is no longer needed, the microcontroller may return to step 820 (step 850: No).

While FIGS. 4-8 (and the accompanying descriptions) describe methods for registering and/or responding to various faults that may arise during vehicle operation, there may be many other conditions that may result in a fault being registered by the microcontroller. For example, in some embodiments in accordance with the present disclosure, the microcontroller may register a sensor-based fault whenever one or more of the signal inputs it receives is irregular. The microcontroller may respond to these faults in a number of appropriate ways, in order to ensure the continued safe operation of the vehicle. Under certain conditions, the microcontroller may direct the power regulator to shut down one of the power sources entirely when it is determined to be failing or posing a risk to the vehicle (e.g., when two or more sensor faults have been registered with respect to the same power source). The ability to shut down and/or turn off the power sources as necessary to maintain safe vehicle operation may allow a vehicle to avoid a failure or crash.

In some embodiments in accordance with the present disclosure, when the vehicle power system operates in the normal power state, all the three power sources are working full functionally, all sensors, actuators, motors are healthy as well. A low noise mode may be provided in which only battery sets provide power to the main power bus to reduce the noise associated with other power sources, for example, combustion engines, while in takeoff and landing phase (e.g., altitude <500 ft. AGL). While climbing or cruising (e.g., altitude >500 ft. AGL to cruise altitude), the main power bus may transmit power from three hybrid engine or full cell, and charge to battery. Low torque mode may be provided and enabled such that the hybrid engine or fuel cell only provide necessary power supply to motors to ensure steady descent while in descent phase. In some embodiments, while the system is in the degrade power state due to one or more power source failures, the remaining functional batteries, hybrid engines, or fuel cells may work together to provide power to motors and essential devices to enable safe flight. In the event that the degrade power state is selected due to a motor/actuator/sensor failure, and all three power sources are still working normally, the low noise mode and low torque mode may still be enabled. However, while in the emergency power state, the system may not enable power optimization, such that all available power sources would be used to aid in safe landing.

Therefore, generally, the methods and systems of the present disclosure may monitor and regulate power supplies and power systems of the vehicle in order to control the vehicle load on the vehicle power system, thereby enabling very low power failure-safety ratios as vehicle power system conditions deteriorate. Furthermore, methods and systems of the present disclosure may use a number of sensor inputs and vehicle conditions to modulate the load on the vehicle power system, and may achieve benefits in addition to safety, including, for example, power efficiency.

The general discussion of this disclosure provides a brief, general description of a suitable computing environment in which the present disclosure may be implemented. In one embodiment, any of the disclosed systems and/or methods may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the embodiments disclosed herein. It is intended that the specification and examples be considered as exemplary only, with a true scope and spirit of the present disclosure being indicated by the following claims.

What is claimed is:

1. A power control system for a vehicle comprising:
   a plurality of sensors associated with one or more power sources;
   one or more microcontrollers configured to receive a plurality of signal inputs from the plurality of sensors, wherein the one or more microcontrollers includes a primary microcontroller; and
   wherein the primary controller selects a power state for the power control system based at least in part on the plurality of signal inputs from the plurality of sensors; wherein the power state is selected from a group including:
      a first power state, wherein the one or more microcontrollers cause a power regulator to provide power to a critical power subsystem, an essential power subsystem, and an auxiliary power subsystem of the vehicle;
      a second power state, wherein the one or more microcontrollers cause the power regulator to provide power to the critical power subsystem and the essential power subsystem of the vehicle, and does not provide power to the auxiliary power subsystem of the vehicle; and
      a third power state, wherein the one or more microcontrollers cause the power regulator to provide power to the critical power subsystem of the vehicle, and does not provide power to the essential power subsystem or the auxiliary power subsystem of the vehicle;
   wherein the critical power subsystem of the vehicle is configured to provide power to a first set of equipment on the vehicle that maintains flight, the essential power subsystem of the vehicle is configured to provide power to a second set of equipment on the vehicle, and the auxiliary power subsystem of the vehicle is configured to provide power to one or more of: a vehicle entertainment system, an air conditioning system, a wireless internet system, and an accessory charging system.

2. The power control system of claim 1, wherein the one or more power sources comprises a first power source, a second power source, and a third power source, and wherein the first power source and the second power source each comprise one or more batteries.

3. The power control system of claim 2, wherein the third power source comprises a fuel cell or a combustion engine.

4. The power control system of claim 1, wherein the plurality of sensors comprises a state of charge sensor for determining a power level, and wherein the primary microcontroller is configured to:
   select the first power state only when the state of charge sensor senses that the power level is over 70% of a power capacity of the one or more power sources;
   select the second power state when the state of charge sensor senses that the power level is over 40% of the power capacity, but less than 60% of the power capacity; and
   select the third power state when the state of charge sensor senses a power level that is less than 30% of the power capacity.

5. The power control system of claim 1, wherein:
   at least one of the one or more power sources is a battery having a battery type; and
   the plurality of sensors comprises a battery temperature sensor and an ambient temperature sensor, and wherein the primary microcontroller is configured to:
      identify a normal operating temperature range based at least in part on an ambient temperature signal from the ambient temperature sensor and the battery type;

register a temperature fault when the battery temperature sensor senses a battery temperature that is not within the normal operating temperature range; and
select, when a temperature fault has been registered, one of: the second power state or the third power state.

6. The power control system of claim 5, wherein:
the plurality of sensors further comprises a battery current sensor and a battery voltage sensor, wherein the primary microcontroller is configured to:
register a current fault when the battery current sensor senses a battery current that is greater than a safe current operating threshold;
register a voltage fault when the battery voltage sensor senses a battery voltage that is not within a safe voltage operating range; and
select, when a current or voltage fault has been registered, one of: the second power state or the third power state.

7. The power control system of claim 6, wherein:
the plurality of sensors comprises a battery surface pressure sensor, and wherein the primary microcontroller is configured to:
register a pressure fault when the battery surface pressure sensor senses a battery pressure that is indicative of battery expansion; and
select, when a pressure fault has been registered, one of: the second power state or the third power state.

8. The power control system of claim 7, wherein the primary microcontroller is configured to select the third power state when two or more faults have been registered.

9. The power control system of claim 8, wherein the primary microcontroller is configured to cause the power regulator to shut down one of the one or more power sources when two or more faults have been registered with respect to one of the one or more power sources.

10. The power control system of claim 1, wherein the one or more microcontrollers comprises two or more microcontrollers, and wherein in the event of a failure of the primary microcontroller, another of the two or more microcontrollers becomes the primary microcontroller.

11. A power control system for a vehicle, wherein the vehicle comprises a critical power subsystem configured to provide power to a first set of equipment on the vehicle that maintains flight, an essential power subsystem configured to provide power to a second set of equipment on the vehicle, and an auxiliary power subsystem configured to provide power to one or more of: a vehicle entertainment system, an air conditioning system, a wireless internet system, and an accessory charging system, the power control system comprising:
one or more microcontrollers each having a processor and a memory, wherein the memory comprises instructions stored thereon that, when executed by the processor, cause the processor to, during operation of the vehicle:
receive a plurality of signal inputs from a plurality of sensors associated with one or more power sources; and
select a power state for the power control system based at least in part on the plurality of signal inputs from the plurality of sensors, wherein the power state is selected from a group including:
a first power state, wherein the microcontroller causes a power regulator to provide power to a critical power subsystem, an essential power subsystem, and an auxiliary power subsystem of the vehicle;
a second power state, wherein the microcontroller causes the power regulator to provide power to the critical power subsystem and the essential power subsystem of the vehicle, and does not provide power to the auxiliary power subsystem of the vehicle; and
a third power state, wherein the microcontroller causes the power regulator to provide power to the critical power subsystem of the vehicle, and does not provide power to the essential power subsystem or the auxiliary power subsystem of the vehicle.

12. The power control system of claim 11, wherein the one or more power sources comprises a first power source, a second power source, and a third power source, and wherein the first power source and the second power source each comprise one or more batteries.

13. The power control system of claim 12, wherein the third power source comprises a fuel cell or a combustion engine.

14. The power control system of claim 11, wherein the plurality of sensors comprises a state of charge sensor for determining a power level, and wherein the memory of the microcontroller further comprises instructions stored thereon that, when executed by the processor, cause the processor to, during operation of the vehicle:
select the first power state only when the state of charge sensor senses that the power level is over 70% of a power capacity of the one or more power sources;
select the second power state when the state of charge sensor senses that the power level is over 40% of the power capacity, but less than 60% of the power capacity; and
select the third power state when the state of charge sensor senses a power level that is less than 30% of the power capacity.

15. The power control system of claim 11, wherein:
at least one of the one or more power sources is a battery having a battery type; and
the plurality of sensors comprises a battery temperature sensor and an ambient temperature sensor;
wherein the memory of the microcontroller further comprises instructions stored thereon that, when executed by the processor, cause the processor to, during operation of the vehicle:
identify a normal operating temperature range based at least in part on an ambient temperature signal from the ambient temperature sensor and the battery type;
register a temperature fault when the battery temperature sensor senses a battery temperature that is not within the normal operating temperature range; and
select, when a temperature fault has been registered, one of: the second power state or the third power state.

16. The power control system of claim 15, wherein:
the plurality of sensors further comprises a battery current sensor and a battery voltage sensor, wherein the memory of the microcontroller further comprises instructions stored thereon that, when executed by the processor, cause the processor to, during operation of the vehicle:
register a current fault when the battery current sensor senses a battery current that is greater than a safe current operating threshold;
register a voltage fault when the battery voltage sensor senses a battery voltage that is not within a safe voltage operating range; and select, when a current or voltage fault has been registered, one of: the second power state or the third power state.

17. The power control system of claim 16, wherein:
the plurality of sensors comprises a battery surface pressure sensor, and wherein the memory of the microcontroller further comprises instructions stored thereon that, when executed by the processor, cause the processor to, during operation of the vehicle:
register a pressure fault when the battery surface pressure sensor senses a battery pressure that is indicative of battery expansion; and
select, when a pressure fault has been registered, one of: the second power state or the third power state.

18. The power control system of claim 17, wherein the memory of the microcontroller further comprises instructions stored thereon that, when executed by the processor, cause the processor to select the third power state when two or more faults have been registered.

19. The power control system of claim 18, wherein the memory of the microcontroller further comprises instructions stored thereon that, when executed by the processor, cause the processor to, during operation of the vehicle:
determine when two or more faults have been registered with respect to one of the one or more power sources; and
shut down the one of the one or more power sources when the processor has determined that two or more faults have been registered.

20. A power control system for a vehicle comprising:
a plurality of sensors associated with three or more power sources, wherein at least two of the three or more power sources each comprise one or more batteries;
one or more microcontrollers each configured to receive a plurality of signal inputs from the plurality of sensors, wherein one of the one or more microcontrollers is a primary microcontroller and selects a power state for the power control system based at least in part on the plurality of signal inputs from the plurality of sensors; wherein the power state is selected from a group including:
a first power state, wherein the one or more microcontrollers cause a power regulator to provide power to a critical power subsystem, an essential power subsystem, and an auxiliary power subsystem of the vehicle;
a second power state, wherein the one or more microcontrollers cause the power regulator to provide power to the critical power subsystem and the essential power subsystem of the vehicle, and does not provide power to the auxiliary power subsystem of the vehicle; and
a third power state, wherein the one or more microcontrollers cause the power regulator to provide power to the critical power subsystem of the vehicle, and does not provide power to the essential power subsystem or the auxiliary power subsystem of the vehicle;
wherein the critical power subsystem of the vehicle is configured to provide power to a first set of equipment on the vehicle that maintains flight, the essential power subsystem of the vehicle is configured to provide power to a second set of equipment on the vehicle, and the auxiliary power subsystem of the vehicle is configured to provide power to one or more of: a vehicle entertainment system, an air conditioning system, a wireless internet system, and an accessory charging system; and
wherein the one or more microcontrollers are configured to register a sensor fault when one or more of the plurality of signal inputs is determined to be irregular, and wherein the primary microcontroller is further configured to cause the power regulator to shut down one of the three or more power sources when two or more sensor faults have been registered with respect to one of the three or more power sources.

* * * * *